May 12, 1953     W. F. TUFTS     2,637,928
NOVEL ORNAMENTAL ACCESSORY FOR VEHICLES
Filed June 6, 1952
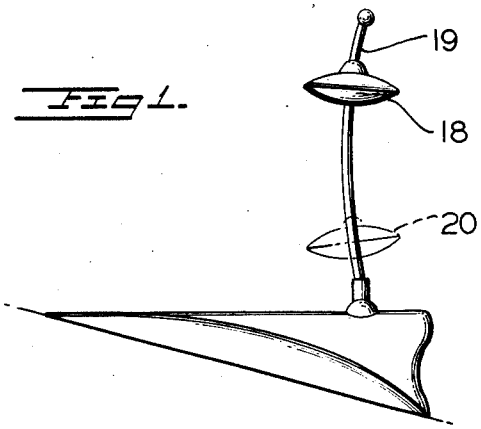
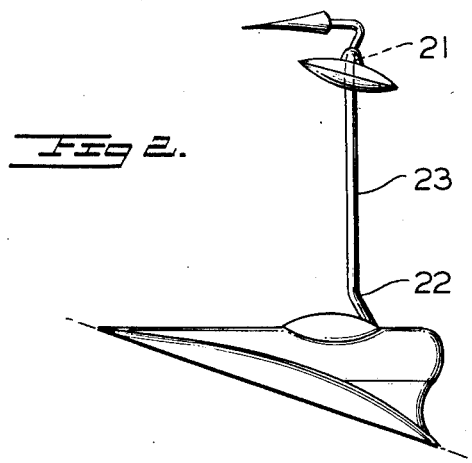
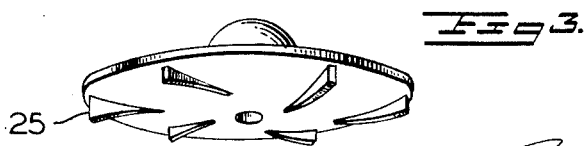
INVENTOR
William F Tufts Patented May 12, 1953

2,637,928

UNITED STATES PATENT OFFICE 2,637,928

NOVEL ORNAMENTAL ACCESSORY FOR VEHICLES

William F. Tufts, Atlanta, Ga.

Application June 6, 1952, Serial No. 292,170

1 Claim. (Cl. 41—34)

This invention pertains to accessories for automobiles and other vehicles which move through the air at substantial speeds and its purpose is to provide a novel and attractive accessory which can be easily mounted on such vehicles and to existing accessories of the vehicles such as aerial rods.

In recent years there have occurred frequent reports of objects being seen in the skies over the United States resembling the shape of a saucer and these objects have come to be prevalently referred to as "flying saucers."

The general aim, therefore, of this invention is to provide an article which can be easily mounted on a vehicle and which will have appearance in motion and behave in a manner suggestive of a "flying saucer."

Conforming to such aim, the article of this invention is a miniature "flying saucer" of light construction having a central axial hole so that the saucer can be mounted on a vertical rod in such a manner that it can slide freely up and down as it travels through the air in a horizontal direction, the force for such vertical motion being supplied by the effect of air currents upon it.

In describing the principles of the invention, general reference will first be made to the accompanying figures in which Figure 1 shows the invention mounted as an ornament on a portion of an automobile;

Figure 2 shows a variation of the invention of Figure 1; and

Figure 3 shows the air actuated object of the invention equipped with fins.

Describing now the principles of the invention, detailed reference will be made to the separate figures. In Figure 1, the flying saucer 18 is mounted on the flight rod 19 which in turn is mounted as an ornament on a portion of a vehicle. The saucer at 20 illustrates the movability of the saucer up and down the rod 19. It is seen that the rod 19 is in the form of an arc, the center of which lies forward and in the direction from which the wind currents come. It is thus seen that in the upper position of the saucer at 18 horizontal wind currents will strike the upward surface and force it downward. In like manner, when the saucer is in the downward position of 20, horizontal wind currents will strike the lower surface and force it upward. This combination results in a highly effective upward and downward motion.

The saucer of Figure 2 is equipped with a bore large enough to allow a change of inclination of the saucer on the rod 23. The rod 23 is bent near its ends at 21 and 22 and these bends serve as a positive means of changing the inclination of the saucer so that when it reaches the upward position as shown, it will be declined for the downward flight. When it then reaches the lower position at 22, the bend will incline the saucer for the upward flight.

In Figure 3, the saucer is equipped with air actuating fins 25 which provide for rotation, adding to the attractiveness of the ornament.

It is not intended that the spirit of this invention be limited to the specific details herein disclosed, there being additional means by which the aims of the invention may be obtained and which fall within the scope of the spirit of this description.

I claim:

In combination with a vehicle, an ornamental device comprising a substantially flattened ellipsoidal object having a central bore transverse to the plane of said flattened ellipsoidal object, a substantially vertically disposed rod extending through said bore, said rod including between the ends thereof a substantial bend for changing the angle of the plane of said object with respect to a flow of air substantially transverse to the axis of said rod whereby the respective sides of the plane of said object are presented to said flow of air as vertical oscillatory motion of said object with respect to said rod is effected by the flow of air over the respective sides of said object, and air reacting fins carried by said object in the path of flow of said air for imparting rotary motion to said object about said rod as an axis.

WILLIAM F. TUFTS.

References Cited in the file of this patent

UNITED STATES PATENTS

| Number | Name | Date |
|---|---|---|
| 2,098,388 | Hruska | Nov. 9, 1937 |
| 2,329,046 | Halbig | Sept. 7, 1943 |
| 2,586,643 | Garlow | Feb. 19, 1952 |

FOREIGN PATENTS

| Number | Country | Date |
|---|---|---|
| 628,644 | Great Britain | Sept. 1, 1949 |